United States Patent
Deshpande et al.

(10) Patent No.: US 9,760,618 B2
(45) Date of Patent: Sep. 12, 2017

(54) DISTRIBUTED ICEBERG CUBING OVER ORDERED DIMENSIONS

(71) Applicant: International Business Machines Corporation, Armonk, NY (US)

(72) Inventors: Prasad M. Deshpande, Bangalore (IN); Rajeev Gupta, New Delhi (IN); Ashu Gupta, New Delhi (IN)

(73) Assignee: International Business Machines Corporation, Armonk, NY (US)

( * ) Notice: Subject to any disclaimer, the term of this patent is extended or adjusted under 35 U.S.C. 154(b) by 353 days.

(21) Appl. No.: 14/658,542

(22) Filed: Mar. 16, 2015

(65) Prior Publication Data

US 2016/0275164 A1 Sep. 22, 2016

(51) Int. Cl.
G06F 17/30 (2006.01)

(52) U.S. Cl.
CPC .. *G06F 17/30592* (2013.01); *G06F 17/30663* (2013.01)

(58) Field of Classification Search
CPC .................. G06F 17/30592; G06F 17/30663
USPC ...................................................... 707/749
See application file for complete search history.

(56) References Cited

U.S. PATENT DOCUMENTS

| | | | | |
|---|---|---|---|---|
| 6,426,967 B1 * | 7/2002 | Tanabe | ............... | H01S 5/2231 372/46.01 |
| 7,133,876 B2 * | 11/2006 | Roussopoulos | ... | G06F 17/30592 707/752 |
| 7,313,568 B2 * | 12/2007 | Cutlip | ............... | G06Q 10/10 |
| 9,619,581 B2 * | 4/2017 | Hughes | ............ | G06F 17/30967 |
| 2009/0228430 A1 * | 9/2009 | Berger | ............. | G06F 17/30592 |
| 2010/0198777 A1 * | 8/2010 | Lo | ................ | G06F 17/30592 707/601 |
| 2015/0310082 A1 * | 10/2015 | Han | ................ | G06F 17/30592 707/602 |

OTHER PUBLICATIONS

Xin, Ding, et al., "Computing Iceberg Cubes by Top-Down and Bottom-Up Integration: The StarCubing Approach", IEEE Transactions on Knowledge and Data Engineering, vol. 19, No. 1, Jan. 2007, pp. 111-126.*
Wang, Xinbao, et al., "Efficient Computation of Iceberg Quotient Cube by Bounding", ICPCA 2008, Alexandria, Egypt, Oct. 6-8, 2008, pp. 424-428.*
de Castro Lima, Joubert, et al., "Multidimensional cyclic-graph approach: Representing a data cube without common sub-graphs", Information Sciences, vol. 181, pp. 2626-2655.*

(Continued)

*Primary Examiner* — Robert Stevens
(74) *Attorney, Agent, or Firm* — Ryan, Mason & Lewis, LLP

(57) ABSTRACT

Methods, systems, and computer program products for distributed iceberg cubing over ordered dimensions are provided herein. A method includes calculating, from input data derived from a search query, a set of multiple cube measures for one or more combinations of multiple non-ordered dimensions; pruning the set of multiple cube measures based on one or more iceberg conditions to generate a sub-set of the cube measures; and determining a range for a set of ordered dimensions over a distributed processing platform based on (i) the sub-set of the cube measures and (ii) the one or more iceberg conditions.

20 Claims, 9 Drawing Sheets

(56) References Cited

OTHER PUBLICATIONS

Ferro, Alfredo, et al., "BitCube: A Bottom-Up Cubing Engineering", DaWaK 2009, LNCS 5691, Springer-Verlag, Berlin, Germany, © 2009, pp. 189-203.*
Wang, Xiaoguo, et al., "Research of Data Cubes Computation Based on Joint Relation Set", ICACTE 2010, Chengdu, China, Aug. 20-22, 2010, pp. 610-613.*
Wang et al. Scalable Data Cube Analysis over Big Data. In Proceedings of CoRR. 2013, 12 pages.
Tsakonas, BucDoop: Bottom Up Computation of Iceberg Data Cubes with Hadoop. Technical University of CRETE, Master Thesis, Jul. 2014, 60 pages.
Beyer et al. Bottom-Up Computation of Sparse and Iceberg CUBEs. ACM SIGMOD, vol. 28, Issue 2, Jun. 1999, pp. 359-370, 12 pages.
Dean et al. MapReduce: Simplified Data Processing on Large Clusters. In Proc. OSDI, pp. 10, 2014, 13 pages.
Nandi et al. Data Cube Materialization and Mining over MapReduce. Transaction on Knowledge and Data Engineering (TKDE), Jan. 2012, 14 pages.

* cited by examiner

202 — Native MapReduce algorithm for Data Cube

Map (key:null, value: {city, item, year, measure});
// use count as measure, for example
// Cubelattice is shown in Figure 1
1 foreach Region r ∈ Cubelattice do
2     group = getGroup (value,r);
3     measure = getMeasure (value);
4     emit⟨group, measure⟩;

Reduce (key:group, values: list of measures);
// use sum as aggregation, for example
1 foreach value ∈ values do
2     sum += value emit⟨group, sum⟩;

*MapReduce algorithm for Hybrid Cube*

Map (*key:null, value: {city, item, year, measure}*);
// use count as measure, for example
1 foreach *batch* ∈ *list of batches* do
2     emit⟨{batch}, (city, item, year, measure)⟩;

Combine (*key:batch, values: list of tuples*);
// values contains tuples from a local mapper
// hmap is HashMap used to aggregate a cube group
1 leaf = batch.leaf ;
2 foreach *value* ∈ *values* do
3     group = getGroup (value,leaf);
4     measure = getMeasure (value);
5     hmap.update(group,measure);
      /* If group is already present add the current
        measure to old measure                    */

6 foreach *record* ∈ *hmap.values* do
7     emit ⟨{batch}, record⟩ ;

Reduce (*key:batch, values: list of tuples*);
// find cube by BUC algorithm 1 head = batch.head;
2 sublattice = getLattice (head);
    /* sublattice is the sub-graph of full cube latice,
      representing a batch                             */
3 input = LoadData (values);
4 outputgroups = BUC (sublattice,head,input,support);
    /* outputgroups stores all the cube groups which
      satisfy support                                   */
5 foreach *group* ∈ *outputgroups* do
6     measure = getMeasure (group);
7     emit ⟨{group}, measure ⟩;

FIG. 4A

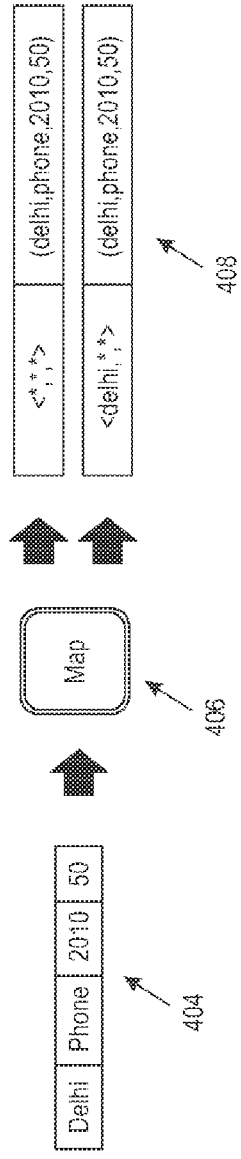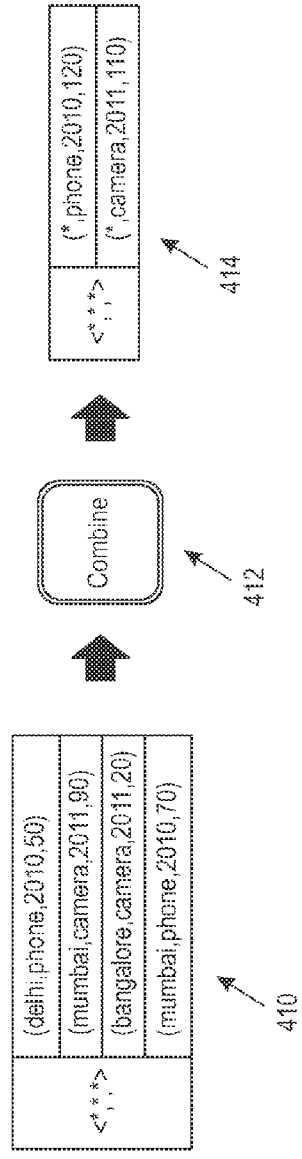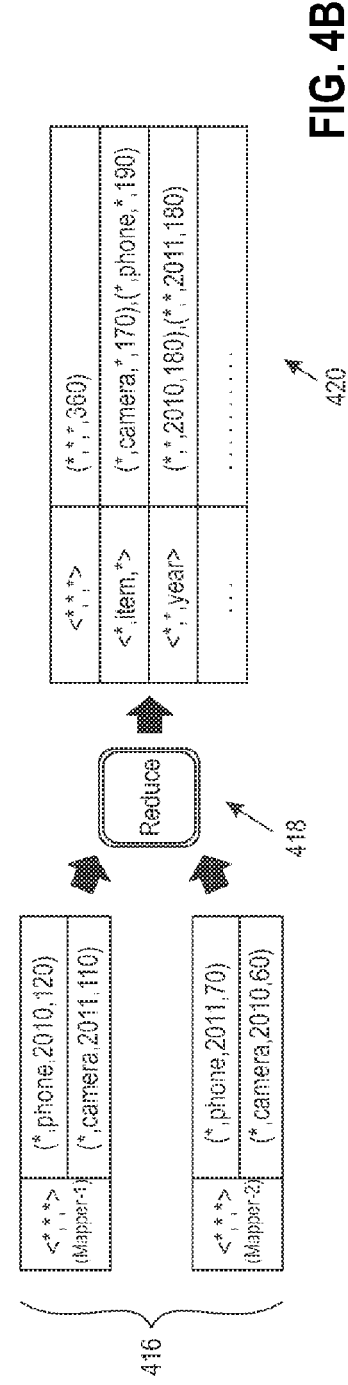
FIG. 4B

502

Dynamic Algorithm to find ranges

// TR be the total recall threshold
Function getRanges(a,sidx,eidx,l,u,maxprecision)
input : Array a[]
output: Range [l,u] having maximum precision and
satisfying Total recall
/* code starts from here                         */
1  initializeDP (sidx);
2  currcount = dp[sidx].c2;
3  currtcount = dp[sidx].t2;
   for $k = sidx + 1$ to $eidx$ do
       currcount += a[k].count;
       currtcount += a[k].tcount;
       si = dp[k-1].s2;
       while ((si < $k$) AND
       ((currtcount - a[si].tcount) >= TR)) do
           currtcount -= a[si].tcount;
           currcount -= a[si].count;
           si++;

dp[k].s2=si;
       dp[k].t2=currtcount;
       dp[k].c2=currcount;
       tmptcount = $dp[k-1].t1 + a[k].tcount$;
       tmpcount = $(dp[k-1].c1 + a[k].count)$;
       tmpprecision = $\frac{dp[k].t2}{dp[k].c2}$;
       if tmpprecision <= $\frac{tmptcount}{tmpcount}$ then
           $dp[k].s1 = dp[k-1].s1$;
           $dp[k].t1 = dp[k-1].t1 + a[k].tcount$;
           $dp[k].c1 = dp[k-1].c1 + a[k].count$;

else
           $dp[k].s1 = dp[k].s2$;
           $dp[k].t1 = dp[k].t2$;
           $dp[k].c1 = dp[k].c2$;

tmpprecision = $\frac{dp[k].t1}{dp[k].c1}$;
       if maxprecision < tmpprecision AND $dp[k].t1$ >= TR
       then
           maxprecision = tmpprecision;
           maxidx = $k$;

$l$ = dp[maxidx].s1;
   $u$ = maxidx;
   //Range [l, u] is the required range

FIG. 5

DISTRIBUTED ICEBERG CUBING OVER ORDERED DIMENSIONS

FIELD

The present application generally relates to information technology, and, more particularly, to data management techniques.

BACKGROUND

Data cubes are implemented in techniques used in various data management applications. A data cube, as used herein, refers to an array of measures (for example, total sale, number of customers, etc.) for a given set of values of a set of dimensions (for example, city, item, year, etc.). By way of example, data cubes can be used to determine the number of customers for every possible value of state and age (wherein, for example, the state equals California and the given age equals 26). Commonly, users of data cubes are interested only in cube entries satisfying some iceberg conditions defined over support, recall, precision, or some aggregate measure. As used herein, an iceberg cube refers to a cube which satisfies some condition over an aggregated measure. An example might include the number of customers for every state and age if the number of customers is more than 10.

Cube aggregations are commonly performed on pre-specified dimensions and hierarchies corresponding thereto. For ordered attributes (which can take continuous values), users may not define (and/or may not wish to define) any hierarchy. For example, for performing aggregations over age, it may not be desirable to divide the domain in pre-specified age ranges (0-10, 10-20, etc.). Rather, it may be desirable to identify the ranges which satisfy the iceberg conditions.

SUMMARY

In one aspect of the present invention, techniques for distributed iceberg cubing over ordered dimensions are provided. An exemplary computer-implemented method can include steps of calculating, from input data derived from a search query, a set of multiple cube measures for one or more combinations of multiple non-ordered dimensions; pruning the set of multiple cube measures based on one or more iceberg conditions to generate a sub-set of the cube measures; and determining a range for a set of ordered dimensions over a distributed processing platform based on (i) the sub-set of the cube measures and (ii) the one or more iceberg conditions.

In another aspect of the invention, an exemplary computer-implemented method can include steps of calculating, from input data, a set of multiple cube measures for one or more combinations of multiple non-ordered dimensions; pruning the set of multiple cube measures based on one or more conditions to generate a sub-set of the multiple cube measures; identifying one or more cube measures from the sub-set of cube measures based on user-specified confidence measures that are based on multiple ordered dimensions; and defining one or more item-sets based on the one or more identified cube measures, wherein the one or more item-sets comprise a range of quantities from the multiple ordered dimensions which occur together in the input data.

Another aspect of the invention or elements thereof can be implemented in the form of an article of manufacture tangibly embodying computer readable instructions which, when implemented, cause a computer to carry out a plurality of method steps, as described herein. Furthermore, another aspect of the invention or elements thereof can be implemented in the form of an apparatus including a memory and at least one processor that is coupled to the memory and configured to perform noted method steps. Yet further, another aspect of the invention or elements thereof can be implemented in the form of means for carrying out the method steps described herein, or elements thereof; the means can include hardware module(s) or a combination of hardware and software modules, wherein the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

BRIEF DESCRIPTION OF THE DRAWINGS

FIG. 2 is a diagram illustrating a naive MapReduce algorithm for data cubing;

FIG. 4A is a diagram illustrating a MapReduce algorithm for hybrid cubing, according to an example embodiment of the invention;

FIG. 4B is a diagram illustrating a graphical depiction of aspects of the MapReduce algorithm depicted in FIG. 4A, according to an example embodiment of the invention;

FIG. 5 is a diagram illustrating a dynamic algorithm to find ranges, according to an example embodiment of the invention;

DETAILED DESCRIPTION

As described herein, an aspect of the present invention includes techniques for distributed iceberg cubing over ordered dimensions, such that cube calculations can be performed in a scalable manner while applying the appropriate iceberg conditions. As used herein, a cube is calculated by performing a number of aggregate measures over a set of dimensions. Additionally, iceberg conditions are specified over the aggregate measures to select a sub-set of cube dimension values over which such conditions are satisfied. For example, and by way of illustration, the aggregate measure can be a number of customers with different ages and states, and an iceberg condition can be that the number of customers should be greater than 10. If for age=80 and State=California, the number of customers is 8, that output will not be given.

At least one embodiment of the invention includes discovering ranges of values for ordered dimensions which satisfy a given iceberg condition. These ranges, along with corresponding cubes with categorical dimensions, can be used in various use-case scenarios.

Figure 1:
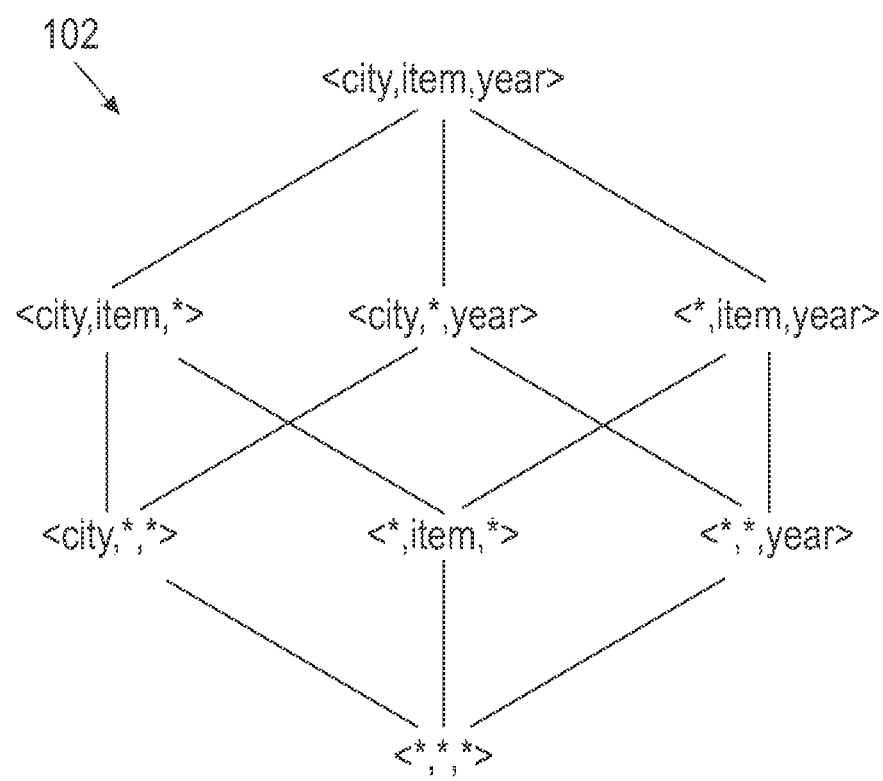
FIG. 1 is a diagram illustrating an example cube lattice, according to an example embodiment of the invention.
Figure 3:
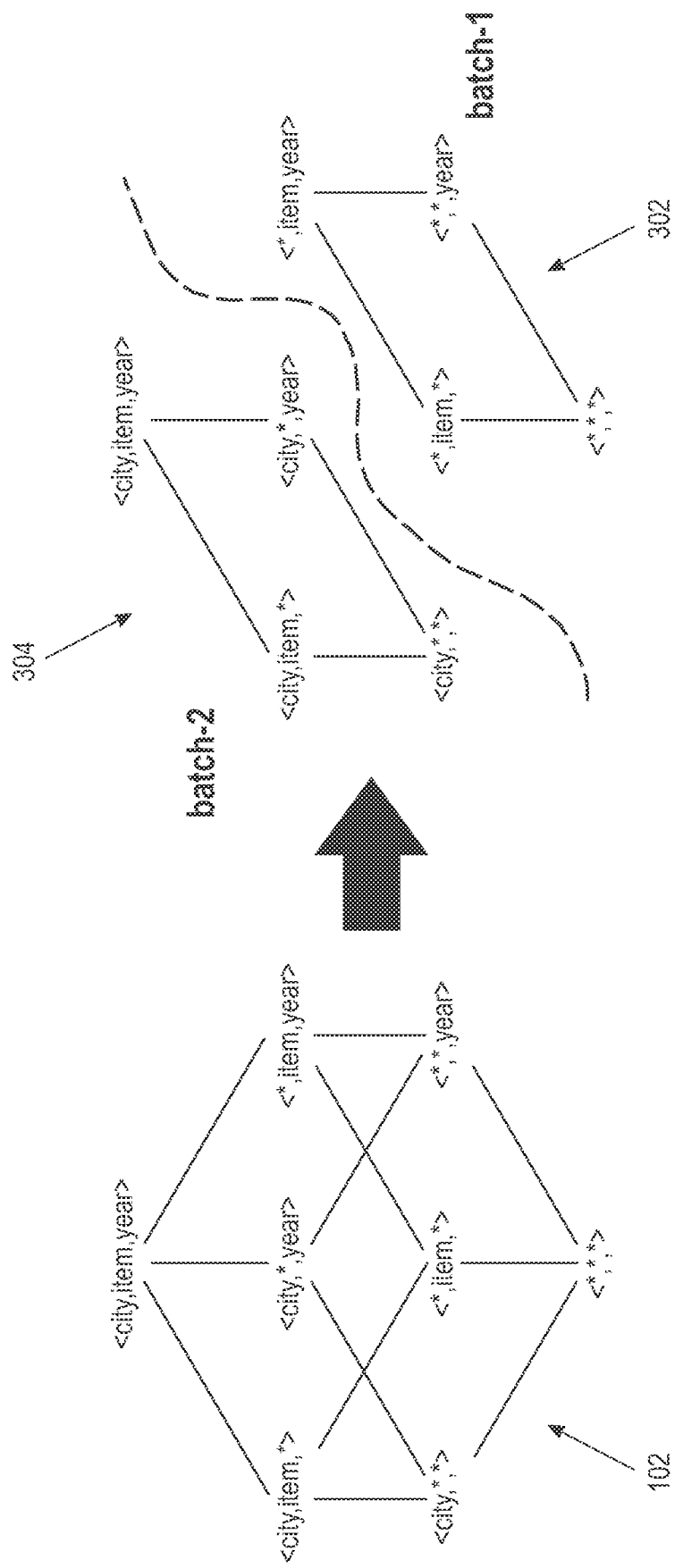
FIG. 3 is a diagram illustrating an example hybrid cube, according to an example embodiment of the invention.

In database terminology, and as used herein, online analytical processing (OLAP) refers to data processing that enables a user to easily and selectively extract and view data from different points of view. Data cubing is a technique to pre-calculate aggregates for various dimensions. The number of dimensions define the total number of data cube values that can be created. Generally, if there are N dimensions, $2^N$ sub-sets of dimensions can be obtained to aggregate upon. Thus, each database row can contribute to $2^N$ cube entries. These sub-sets of dimensions form a cube lattice—a hierarchical structure which connects different sub-sets of dimensions based on their dependencies. That is, cube entry A is connected with cube entry B if one can calculate B using only A. The cube lattice can be divided into a number of sub-lattices such that this dependency relationship is maintained. By way of illustration, FIG. 1 shows an example lattice with three dimensions (city, item, and year). FIG. 3 shows how a lattice can be divided into two sub-lattices. In this lattice (or in any sub-lattice), the bottom-most entry is referred to as a leaf, whereas the top-most entry is referred to as the head. The head entry of a lattice or sub-lattice can be used to calculate all of the entries in that lattice. For example, one can use <*, item, year> (that is, aggregated measures over a particular value of item and year for all of the values of city) to calculate all of the aggregations required for <*, item, *> (aggregated measures over particular values of the item irrespective of values of city and year), <*,*, year>, and <*,*,*>.

Distributed parallel computing provides another viable platform for cube calculation. Here, processing tasks are generally dispersed across multiple processors operating on one or more computing devices such that parallel processing may be executed simultaneously. Implementations of large scale distributed parallel computing systems include, for example, MapReduce by Google®, Dryad by Microsoft®, and the Hadoop® MapReduce implementation. In such techniques, different machines may each process part of a query independently, with results then being aggregated. For cube calculation, each mapper, across different machines, will process a part of database rows and emit key-value pairs. All of the values corresponding to a single key are processed by one reducer, at one machine. In an example MapReduce implementation of cube-calculation (shown, for example, in FIG. 2), as $2^N$ cube entries (corresponding to any sub-set of N dimensions) are needed, $2^N$ map keys are emitted for each input database row. Different cube entries can be calculated by different reducers.

Instead, in at least one embodiment of the invention, cubing is performed by dividing a cube lattice (over dimensions) into sub-lattices or batches, wherein each batch contains one head and a leaf so as to reduce the number of map keys required for processing the data. Rather than emitting one map key for each cube lattice entry, at least one embodiment of the invention includes emitting one map key for each batch. The map key corresponds to the leaf of the batch, whereas the value part corresponds to the head of the batch.

At least one embodiment of the invention includes computing iceberg cubes over ordered dimensions in a distributed network with possible continuous values via (early) pruning of cube calculations in a scalable manner based on iceberg conditions, and utilizing the cube calculations for discovering a range of values for ordered dimensions. By way of example, one or more embodiments of the invention include determining iceberg cubes over dimensions by first calculating cubes over non-ordered dimensions and finding ranges for ordered dimensions over distributed processing platforms.

Association rule mining or frequent item-set mining represent techniques for discovering relations between variables of large databases. For example, the rule {onion, potatoes}=>meat found in the sales data indicates that if a customer buys onions and potatoes together, he or she is also likely to buy meat. To select interesting rules, various measures such as support, confidence, etc., can be used. Support of an item-set is defined as the proportion or number of transactions in the data-set which contain the item-set. Similarly, confidence for {onion, potatoes}=>meat is defined as the ratio of support of {onion, potatoes, meat} and support of {onion, potatoes}.

At least one embodiment of the invention includes using an iceberg cube over ordered dimensions for frequent item-set mining for calculating cube values for various combinations of dimensions by (early) pruning of cube calculations based on iceberg conditions with possible support and confidence. Such cube entries are filtered out with user-specified support and confidence, and the cube entries are used to define item-sets with a range of quantities which occur together in the input data. Thus, at least one embodiment of the invention can include performing frequent item-set mining over ordered quantities. For example, association rules such as {Intel® Core™ i5}=>{random access memory (RAM) size between 4 gigabytes (GB) and 8 GB} can be obtained.

With respect to utilizing distributed processing, the size of input data can be very large, and the size of a cube can also be very large; for example, for N dimensions, each database row may lead to as many as $2^N$ cube entries. Also, with distributed processing, different cube entries can be independent of each other. By way of example, at least one embodiment of the invention includes using Hadoop® MapReduce for distributed execution of iceberg cubing.

FIG. 1 is a diagram illustrating an example cube lattice, according to an example embodiment of the invention. By way of illustration, FIG. 1 depicts cube lattice 102 of D=R(city, item, year) having nodes as cube regions for dimensions D and database relation R. In other words, FIG. 1 depicts a cube lattice 102 over a set of dimensions (city, item, year) and one or more measures (for example, total sale). In FIG. 1, an asterisk indicates the performance of the aggregation and calculation of the measure independent of the value of that particular dimension. For example, <*, item, year> indicates that aggregated measures will be obtained for <all values of city, particular value of item, and particular year>, say, <*, phone, 2010>.

FIG. 2 is a diagram illustrating a naïve MapReduce algorithm 202 for data cubing. As noted above, at least one embodiment of the invention includes utilizing a MapReduce implementation to determine the entire cube (ignoring iceberg conditions), and subsequently applying the iceberg conditions, as further detailed herein.

At least one embodiment of the invention includes implementing bottom-up cubing (BUC). If the iceberg condition is anti-monotonic, then bottom-up cubing can be used to prune the cube entries which are not likely to satisfy the iceberg condition. For instance, if the sum of a measure (say, the number of customers) for <Delhi, all items, all years> is less than 1000, then the sum of the measure for <Delhi, one item, all years> cannot be more than 1000. Also, for example, if <Delhi, *, *> does not have sufficient support, then it is not necessary to calculate a cube for <Delhi, phone, *>. Also, bottom-up cubing calculates cubes in a certain order, and if support for one particular region is not sufficient, it is not necessary to proceed with the corresponding child regions.

Additionally, at least one embodiment of the invention includes implementing MapReduce cubing (MR cubing). MapReduce cubing represents a MapReduce implementation of cube computation. Sampling is used to determine an estimate of the number of rows to be processed for each cube region. Also, MapReduce cubing uses partitioning to ensure that a reducer is not over-loaded with the number of rows to process. Further, MapReduce cubing uses batching (dividing a lattice into sub-lattices) to share a computation across different regions. Accordingly, the same reducer will calculate the cube over <Delhi, phone, *> and corresponding <Delhi, phone, 2010>. An algorithm such as implemented in one or more embodiments of the invention can be extended to prune cube computations using techniques similar to bottom-up cubing.

FIG. 3 is a diagram illustrating an example hybrid cube, according to an example embodiment of the invention. By way of illustration, FIG. 3 depicts cube lattice 102, a first lattice batch 302 and a second lattice batch 304. As detailed herein, at least one embodiment of the invention includes implementing a hybrid cube, which is an extension and/or a combination of bottom-up and top-down cubing. Instead of generating each region independently, at least one embodiment of the invention includes generating a lattice in batches, wherein each batch has a designated head and a leaf. Batches can be generated by dividing the cube lattice into a number of sub-lattice such that each sub-lattice has one head and one leaf. Additionally, instead of emitting $O(2^n)$ keys for each row, the number of keys will be same as the number of batches.

FIG. 4A is a diagram illustrating a MapReduce algorithm 402 for hybrid cubing, according to an example embodiment of the invention. Algorithm 402 includes first dividing the cube lattice in batches or sub-lattices. Additionally, algorithm 402 is presented as a map-combine-reduce function. The map function processes each database row and emits once for each batch. The map keys are obtained using a batch leaf (the bottom-most node of the batch) and a map value from all of the cube dimensions and measures. For example, for a database row [city=Delhi, item=phone, year=2010, measure=50], the map function will emit two map keys as <*,*,*> and <Delhi,*,*> for batches batch-1 and batch-2, respectively, as shown in FIG. 3. For both keys, emitted values will be <Delhi, phone, 2010, 50>. All of the emitted data—from the same mapper having the same map-key—are processed by a single combiner call. Thus, all of the map emitted data with key <*,*,*> is processed by one combiner call, whereas another combiner call will process the data with key <Delhi,*,*>. The combiner aggregates the values as per head node of the batch. Accordingly, for each key of type <Delhi,*,*>, as the head node of the batch (as given in FIG. 3) is <city, item, year>, aggregates will be generated for each value of <city, item, year> combinations. Similarly, using map values for <*,*,*> keys, it will obtain the aggregated values of the form <*, item, year, aggregate of measure>, that is, <*, phone, year, sum of sales>. These values are emitted by the combiner. All of the values belonging to the same keys are collected at a single reducer. The reducer performs aggregations to determine the aggregated measures for each lattice entry. The design of batches and the algorithms detailed herein ensure that the head node can be used to calculate any other node in the lattice. For example, one can use measures for <*,item, year> to calculate measures for any of the nodes in batch-1 of FIG. 3.

FIG. 4B is a diagram illustrating a graphical depiction of aspects of the MapReduce algorithm 402 depicted in FIG. 4A, according to an example embodiment of the invention. By way of illustration, FIG. 4B depicts the aspect of a map component 406 emitting each batch leaf 404 as a key and each tuple as a value (illustrated via component 408). Additionally, FIG. 4B depicts the aspect of a combine component 412 combining map output 410 by aggregating on a batch head for each mapper. Component 414 shows the aggregated output of the combiner for a particular map key. All of the combiner output corresponding to the same key is aggregated by the same reducer, as shown by component 416. Further, FIG. 4B also depicts the aspect of determining other cube groups via a bottom-up cubing algorithm implemented via a reduce component 418, which generates output illustrated via component 420 in FIG. 4B.

As described herein, in utilizing a hybrid cube, the number of map keys to the reducers can be reduced (compared to naive and other existing approaches), similar to MapReduce cubing techniques. Additionally, in at least one embodiment of the invention, a combiner can be used to reduce the data transfer from mappers to reducers. For example, instead of each row, a combiner may output aggregation for a number of database rows. Accordingly, in at least one embodiment of the invention, an entire lattice can be divided into sub-lattices such that each sub-lattice has only one head and one leaf, and a head entry can be sufficient to calculate a cube for an entire batch.

At least one embodiment of the invention also includes discovering ranges of ordered dimensions satisfying the iceberg condition. Such an embodiment includes obtaining and/or deriving aggregate measures for each value of a dimension. By way of example, consider an implementation wherein the user is interested in two counts (total counts (supports for a particular dimension value—say, users buying potatoes) and true-counts (the number of rows satisfying certain conditions—say, the number or the percentage of users also buying bread)) for an entity-matching scenario wherein at least one of the dimension values is in a continuous range (such as age of the user). In such an example, the user aims to determine the maximal range which has a certain recall (say, greater than 10) and has the highest precision value. As used herein in this example, recall refers to the total number of true counts, and precision refers to the total number of true counts divided by the total number of total counts; that is, recall for a range 0.1 to 0.2 will be the sum total of all of the true counts with dimension values between this range. Similarly, the precision will be ratio of sum of true counts and sum of total counts. Precision can be represented in percentages.

At least one embodiment of the invention includes using a dynamic programming based solution for carrying out computations such as noted in the above example. For instance, for a value of an ordered dimension, at least one embodiment of the invention includes identifying the range which has a certain minimum recall with maximum precision.

FIG. 5 is a diagram illustrating a dynamic algorithm 502 to find ranges, according to an example embodiment of the invention. Continuous valued dimensions can pose challenges in an iceberg cube calculation. Such dimensions can have a large number of values or high cardinality. This can lead to low recall values for each individual value of the dimension. In the above example, year may have a large cardinality; thus, for any particular value of the year (say, <Delhi, phone, 2010>), a recall measure may be small, thus not satisfying the iceberg condition. But, if the range is introduced, the iceberg condition on recall may be satisfied. For example, <Delhi, phone, year between 2009 and 2012> may satisfy the iceberg condition. FIG. 5 shows the algorithm 502 to determine such ranges satisfying a total recall and having the maximum precision. In algorithm 502, six values are maintained: DP[i]={$s_1,t_1,c_1, s_2,t_2,c_2$} for each value of the continuous dimension i (say, year=2010)—such that the range [j, i] (j<i) has maximum precision at j=$s_1$ and satisfies the iceberg condition on total recall; $s_2$ is the maximum value of dimension so that the range of values [$s_2$,i] satisfies the iceberg condition on total recall; $t_1$ and $c_1$ are the true count and the total count, respectively, for the range [$s_1$,i]; and $t_2$ and $c_2$ are the true count and the total count, respectively, for the range [$s_2$,i]. These six values {$s_1$, $t_1$, $c_1$, $s_2$, $t_2$, $c_2$} are calculated for each value of the ordered dimension where, say, these 6 values for year=2010 can be calculated by using values for the year=2009. After determining these values, the range that satisfies the iceberg condition on recall (while also having maximum precision) can be determined. Algorithm 502 can be extended for more than one ordered dimensions (say, year and age).

As noted in algorithm 502, $s_1$ represents the start index of the range satisfying the recall condition with maximum precision, and $s_2$ represents the maximum start index of the range satisfying the recall condition.

Figure 6:
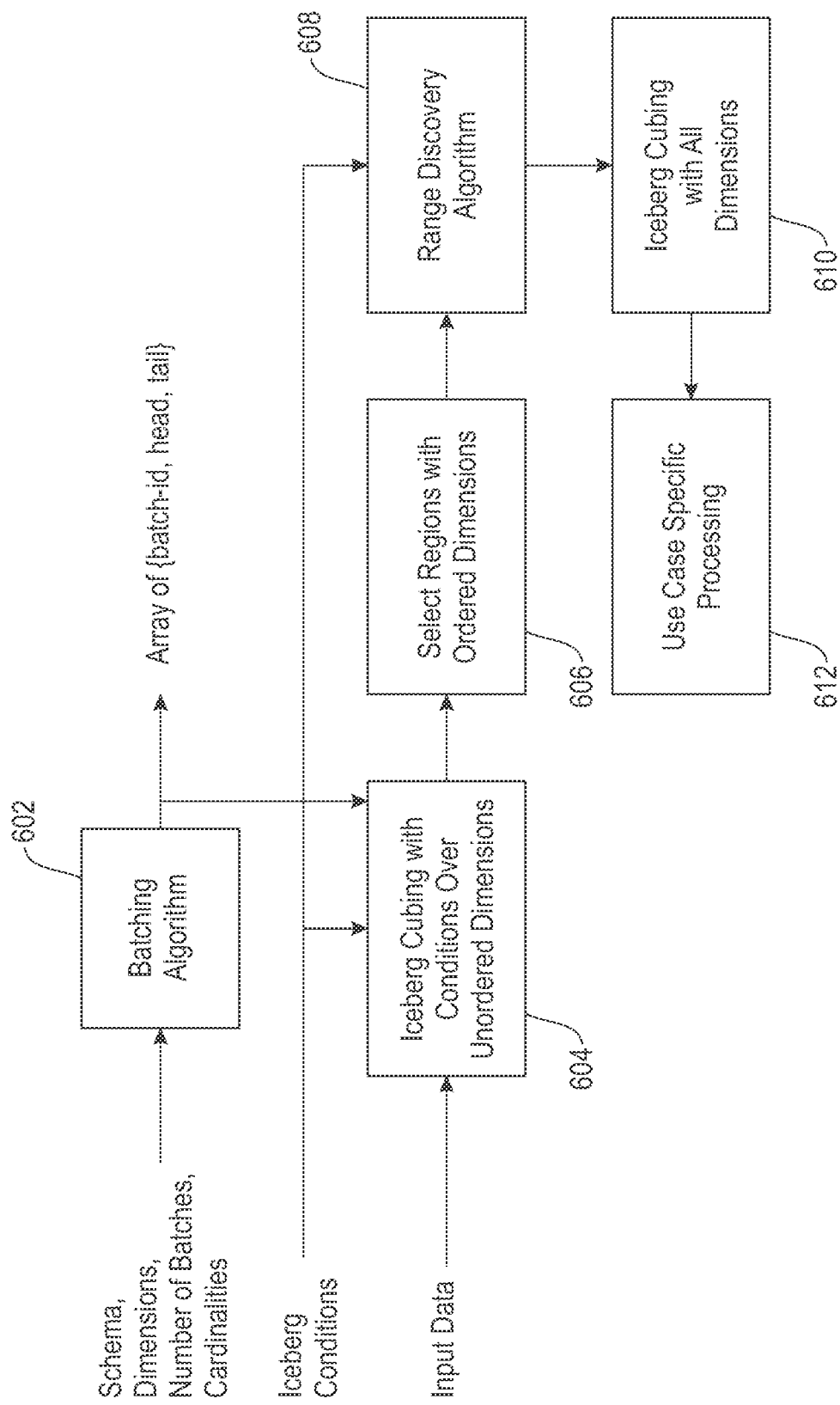
FIG. 6 is a diagram illustrating system architecture, according to an example embodiment of the invention.

FIG. 6 is a diagram illustrating system architecture, according to an example embodiment of the invention. By way of illustration, FIG. 6 depicts a batching algorithm component 602, which receives a schema, dimensions, the number of batches, and cardinalities, and outputs an array of {batch-id, head, tail} data. The batching algorithm component 602 provides input to an iceberg cubing component 604, which also receives separate input data as well as iceberg conditions. Accordingly, the iceberg cubing component 604 carries out iceberg cubing with the received iceberg conditions over unordered dimensions.

The iceberg cubing component 604 provides input to a region selection component 606 in the form of an iceberg cube lattice, which selects regions in the lattice with the ordered dimensions. The region selection component 606 then provides input to a range discovery algorithm component 608, which also receives the initial iceberg conditions. The range discovery algorithm component 608 provides discovered ranges to an iceberg cubing component 610, which performs iceberg cubing with all dimensions (that is, both unordered dimensions and ordered dimensions). The iceberg cubing component 610 then provides input in the form of a cube output for individual values and a range of dimensions to a use case component 612, which can correspondingly carry out use case specific processing.

Figure 7:
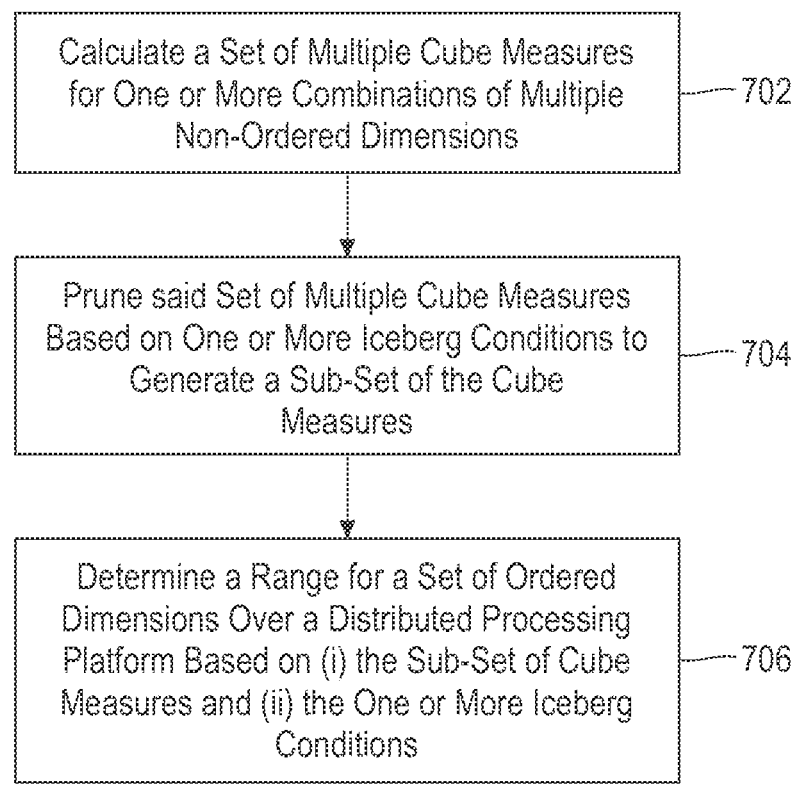
FIG. 7 is a flow diagram illustrating techniques according to an embodiment of the invention.

FIG. 7 is a flow diagram illustrating techniques according to an embodiment of the present invention. Step 702 includes calculating (from input data derived from a search query) a set of multiple cube measures for one or more combinations of multiple non-ordered dimensions, wherein the calculating is executed by a cubing component, carrying out algorithm 402 (as depicted in FIG. 4A) and executing on a distributed computing platform (for example, a hardware process, a software component, and/or a cloud).

Step 704 includes pruning the set of multiple cube measures based on one or more iceberg conditions to generate a sub-set of the cube measures, wherein the pruning is executed by a cubing component executing on the distributed computing platform. Pruning can include performing bottom-up cubing to prune each of the multiple cube measures that does not (or is not likely to) satisfy the one or more iceberg conditions. As also detailed herein, at least one embodiment of the invention includes pruning in a scalable manner based on the one or more iceberg conditions.

Step 706 includes determining a range for a set of ordered dimensions over a distributed processing platform based on (i) the sub-set of the cube measures and (ii) the one or more iceberg conditions, wherein the determining is executed by a range discovery component (as detailed in FIG. 5) executing on the distributed computing platform.

The techniques depicted in FIG. 7 can also include executing a use-case calculation based on (i) the determined range (of multiple values) for the set of ordered dimensions and (ii) the sub-set of the cube measures. As also detailed herein, in at least one embodiment of the invention, the cube associated with the set of multiple cube measures includes a lattice cube. Additionally, such an embodiment can include dividing the lattice cube into multiple sub-lattices (or batches), wherein each of the multiple sub-lattices contains (i) a head and (ii) a leaf. Further, such dividing can include reducing a number of data transfers required for processing data associated with the lattice cube.

Additionally, at least one embodiment of the invention includes calculating, from input data, a set of multiple cube measures for one or more combinations of multiple non-ordered dimensions, wherein the calculating is executed by a hybrid cube component executing on a distributed computing platform. Such an embodiment further includes pruning the set of multiple cube measures based on one or more conditions to generate a sub-set of the multiple cube measures, wherein the pruning is executed by a cubing component executing on the distributed computing platform. Also, such an embodiment includes identifying one or more cube measures from the sub-set of cube measures based on user-specified confidence measures that are based on multiple ordered dimensions, and defining one or more item-sets based on the one or more identified cube measures, wherein the one or more item-sets comprise a range of quantities from the multiple ordered dimensions which occur together in the input data.

The techniques depicted in FIG. 7 can also, as described herein, include providing a system, wherein the system includes distinct software modules, each of the distinct software modules being embodied on a tangible computer-readable recordable storage medium. All of the modules (or any sub-set thereof) can be on the same medium, or each can be on a different medium, for example. The modules can include any or all of the components shown in the figures and/or described herein. In an aspect of the invention, the modules can run, for example, on a hardware processor. The method steps can then be carried out using the distinct software modules of the system, as described above, executing on a hardware processor. Further, a computer program product can include a tangible computer-readable recordable storage medium with code adapted to be executed to carry out at least one method step described herein, including the provision of the system with the distinct software modules.

Additionally, the techniques depicted in FIG. 7 can be implemented via a computer program product that can include computer useable program code that is stored in a computer readable storage medium in a data processing system, and wherein the computer useable program code was downloaded over a network from a remote data processing system. Also, in an aspect of the invention, the computer program product can include computer useable program code that is stored in a computer readable storage medium in a server data processing system, and wherein the computer useable program code is downloaded over a network to a remote data processing system for use in a computer readable storage medium with the remote system.

An aspect of the invention or elements thereof can be implemented in the form of an apparatus including a memory and at least one processor that is coupled to the memory and configured to perform exemplary method steps.

Figure 8:
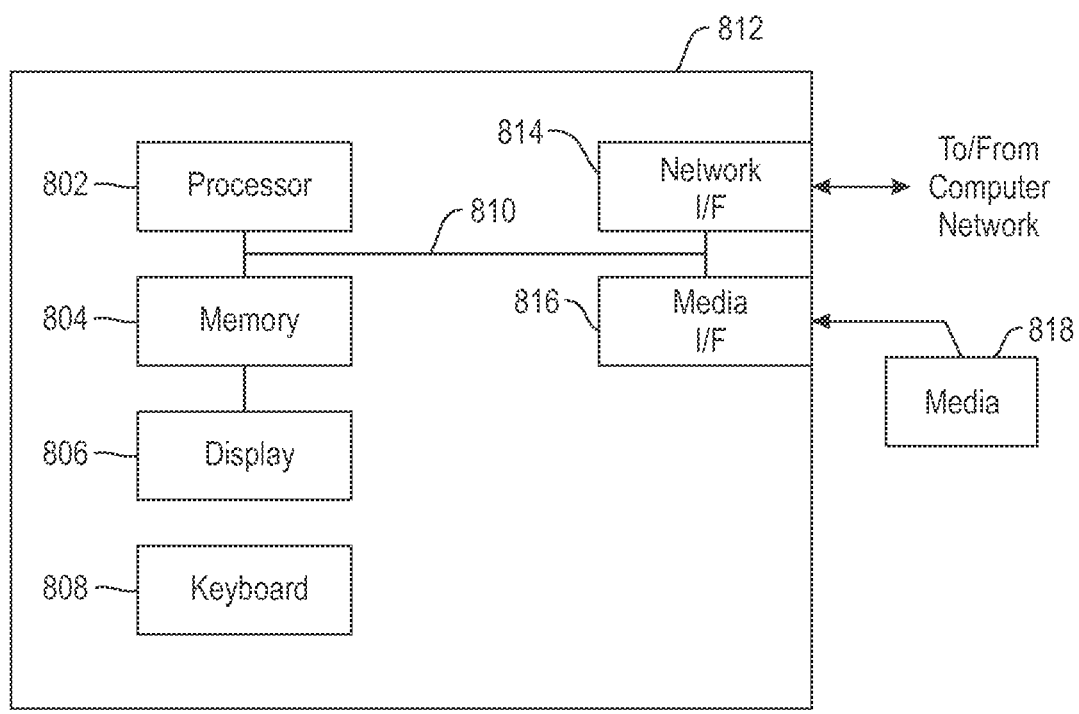
FIG. 8 is a system diagram of an exemplary computer system on which at least one embodiment of the invention can be implemented.

Additionally, an aspect of the present invention can make use of software running on a general purpose computer or workstation. With reference to FIG. 8, such an implementation might employ, for example, a processor 802, a memory 804, and an input/output interface formed, for example, by a display 806 and a keyboard 808. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, a mechanism for inputting data to the processing unit (for example, mouse), and a mechanism for providing results associated with the processing unit (for example, printer). The processor 802, memory 804, and input/output interface such as display 806 and keyboard 808 can be interconnected, for example, via bus 810 as part of a data processing unit 812. Suitable interconnections, for example via bus 810, can also be provided to a network interface 814, such as a network card, which can be provided to interface with a computer network, and to a media interface 816, such as a diskette or CD-ROM drive, which can be provided to interface with media 818.

Accordingly, computer software including instructions or code for performing the methodologies of the invention, as described herein, may be stored in associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 802 coupled directly or indirectly to memory elements 804 through a system bus 810. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including but not limited to keyboards 808, displays 806, pointing devices, and the like) can be coupled to the system either directly (such as via bus 810) or through intervening I/O controllers (omitted for clarity).

Network adapters such as network interface 814 may also be coupled to the system to enable the data processing system to become coupled to other data processing systems or remote printers or storage devices through intervening private or public networks. Modems, cable modems and Ethernet cards are just a few of the currently available types of network adapters.

As used herein, including the claims, a "server" includes a physical data processing system (for example, system 812 as shown in FIG. 8) running a server program. It will be understood that such a physical server may or may not include a display and keyboard.

As will be appreciated by one skilled in the art, aspects of the present invention may be embodied as a system, method and/or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, as noted herein, aspects of the present invention may take the form of a computer program product that may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (for example, light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It should be noted that any of the methods described herein can include an additional step of providing a system comprising distinct software modules embodied on a computer readable storage medium; the modules can include, for example, any or all of the components detailed herein. The method steps can then be carried out using the distinct software modules and/or sub-modules of the system, as described above, executing on a hardware processor 802. Further, a computer program product can include a computer-readable storage medium with code adapted to be implemented to carry out at least one method step described herein, including the provision of the system with the distinct software modules.

In any case, it should be understood that the components illustrated herein may be implemented in various forms of hardware, software, or combinations thereof, for example, application specific integrated circuit(s) (ASICS), functional circuitry, an appropriately programmed general purpose digital computer with associated memory, and the like. Given the teachings of the invention provided herein, one of ordinary skill in the related art will be able to contemplate other implementations of the components of the invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of another feature, integer, step, operation, element, component, and/or group thereof.

The corresponding structures, materials, acts, and equivalents of all means or step plus function elements in the claims below are intended to include any structure, material, or act for performing the function in combination with other claimed elements as specifically claimed.

At least one aspect of the present invention may provide a beneficial effect such as, for example, distributed iceberg cubing over ordered dimensions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:
1. A method, comprising:
calculating, from input data derived from a search query, a set of multiple cube measures for one or more combinations of multiple non-ordered dimensions, wherein said calculating is executed by a cubing component executing on a distributed computing platform;

pruning the set of multiple cube measures based on one or more iceberg conditions to generate a sub-set of the cube measures, wherein said pruning is executed by a cubing component executing on the distributed computing platform; and determining a range for a set of ordered dimensions over a distributed processing platform based on (i) the sub-set of the cube measures and (ii) the one or more iceberg conditions, wherein said determining is executed by a range discovery component executing on the distributed computing platform.

2. The method of claim 1, wherein said pruning comprises performing bottom-up cubing to prune each of the multiple cube measures that does not satisfy the one or more iceberg conditions.

3. The method of claim 1, wherein said pruning comprises pruning in a scalable manner based on the one or more iceberg conditions.

4. The method of claim 1, comprising:
executing a use-case calculation based on (i) the determined range for the set of ordered dimensions and (ii) the sub-set of the cube measures.

5. The method of claim 1, wherein a cube associated with said set of multiple cube measures comprises a lattice cube.

6. The method of claim 5, comprising:
dividing the lattice cube into multiple sub-lattices, wherein each of the multiple sub-lattices contains (i) a head and (ii) a leaf.

7. The method of claim 6, wherein said dividing comprises reducing a number of data transfers required for processing data associated with the lattice cube.

8. A computer program product, the computer program product comprising a computer readable storage medium having program instructions embodied therewith, the program instructions executable by a computing device to cause the computing device to:
calculate, from input data derived from a search query, a set of multiple cube measures for one or more combinations of multiple non-ordered dimensions;
prune the set of multiple cube measures based on one or more iceberg conditions to generate a sub-set of the cube measures; and
determine a range for a set of ordered dimensions over a distributed processing platform based on (i) the sub-set of the cube measures and (ii) the one or more iceberg conditions.

9. The computer program product of claim 8, wherein said pruning comprises performing bottom-up cubing to prune each of the multiple cube measures that does not satisfy the one or more iceberg conditions.

10. The computer program product of claim 8, wherein said pruning comprises pruning in a scalable manner based on the one or more iceberg conditions.

11. The computer program product of claim 8, wherein the program instructions executable by the computing device further cause the computing device to:
execute a use-case calculation based on (i) the determined range for the set of ordered dimensions and (ii) the sub-set of the cube measures.

12. The computer program product of claim 8, wherein a cube associated with said set of multiple cube measures comprises a lattice cube.

13. The computer program product of claim 12, wherein the program instructions executable by the computing device further cause the computing device to:
divide the lattice cube into multiple sub-lattices, wherein each of the multiple sub-lattices contains (i) a head and (ii) a leaf.

14. The computer program product of claim 13, wherein said dividing comprises reducing a number of data transfers required for processing data associated with the lattice cube.

15. A system comprising:
a memory; and
at least one processor coupled to the memory and configured for:
calculating, from input data derived from a search query, a set of multiple cube measures for one or more combinations of multiple non-ordered dimensions;
pruning the set of multiple cube measures based on one or more iceberg conditions to generate a sub-set of the cube measures; and
determining a range for a set of ordered dimensions over a distributed processing platform based on (i) the sub-set of the cube measures and (ii) the one or more iceberg conditions.

16. A method, comprising:
calculating, from input data, a set of multiple cube measures for one or more combinations of multiple non-ordered dimensions, wherein said calculating is executed by a hybrid cube component executing on a distributed computing platform;
pruning the set of multiple cube measures based on one or more conditions to generate a sub-set of the multiple cube measures, wherein said pruning is executed by a cubing component executing on the distributed computing platform;
identifying one or more cube measures from the sub-set of cube measures based on user-specified confidence measures that are based on multiple ordered dimensions; and
defining one or more item-sets based on the one or more identified cube measures, wherein the one or more item-sets comprise a range of quantities from the multiple ordered dimensions which occur together in the input data.

17. The method of claim 16, wherein said pruning comprises performing bottom-up cubing to prune each of the multiple cube measures that does not satisfy the one or more conditions.

18. The method of claim 16, wherein said pruning comprises pruning in a scalable manner based on the one or more conditions.

19. The method of claim 16, wherein a cube associated with said set of multiple cube measures comprises a lattice cube.

20. The method of claim 16, comprising:
dividing the lattice cube into multiple sub-lattices, wherein each of the multiple sub-lattices contains (i) a head and (ii) a leaf, and wherein said dividing comprises reducing a number of data transfers required for processing data associated with the lattice cube.

* * * * *